March 13, 1934.  B. BURNS  1,950,781

PORTABLE REFRIGERATION DEVICE

Filed July 6, 1932   2 Sheets-Sheet 1

Inventor
Bruce Burns
by
Paul W. Harris
Attorney

March 13, 1934.  B. BURNS  1,950,781
PORTABLE REFRIGERATION DEVICE
Filed July 6, 1932  2 Sheets-Sheet 2
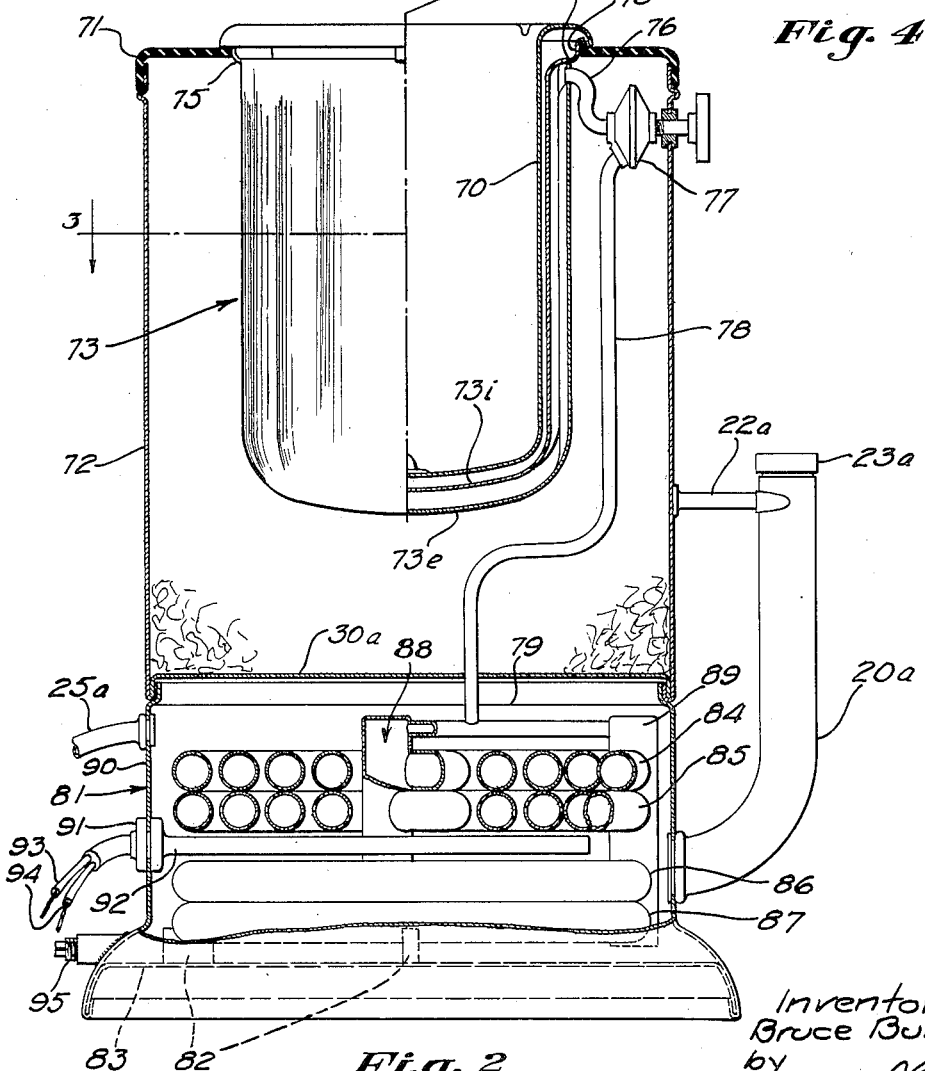
Inventor
Bruce Burns
by
Fad Main
Attorney.

Patented Mar. 13, 1934

1,950,781

UNITED STATES PATENT OFFICE 1,950,781

PORTABLE REFRIGERATION DEVICE

Bruce Burns, Los Angeles, Calif., assignor to Patco, Inc., Los Angeles, Calif., a corporation of California Application July 6, 1932, Serial No. 621,059

8 Claims. (Cl. 62—120)

My invention pertains to the art of refrigeration, and particularly to that portion of the art which concerns itself with portable units for the freezing of foodstuffs, such as ice creams. Among the more important objects of my invention are the following:

1. To provide a complete self-contained unit in which are incorporated the essential refrigeration elements for extracting heat from the material to be frozen.
2. To provide an apparatus which may be repeatedly regenerated to carry out successive freezing cycles.
3. To provide an apparatus which, in certain forms, requires neither electricity nor gas, but only hot and cold water for operation of repeated freezing and regenerating cycles.
4. To provide an apparatus in which material, after being frozen, may be kept in the frozen condition for a considerable period of time.
5. To provide an hermetically sealed refrigerant system from which refrigerant can escape only by rupture of a portion of the system.
6. To provide a portable unit which may be used on camping trips, sailing vessels, mountain lodges and in other places remote from sources of gas or electricity.

Other objects, advantages, and features of novelty will be evident from the specification and drawings.

Figure 2 is a partially sectioned elevation of another form of my invention, preferred for use with certain other refrigerants.

Figure 3 is a partial horizontal section taken on line 3—3 of Figure 2.

Figure 4 is a section through a diaphragm valve, as used in my invention.

Figure 1:
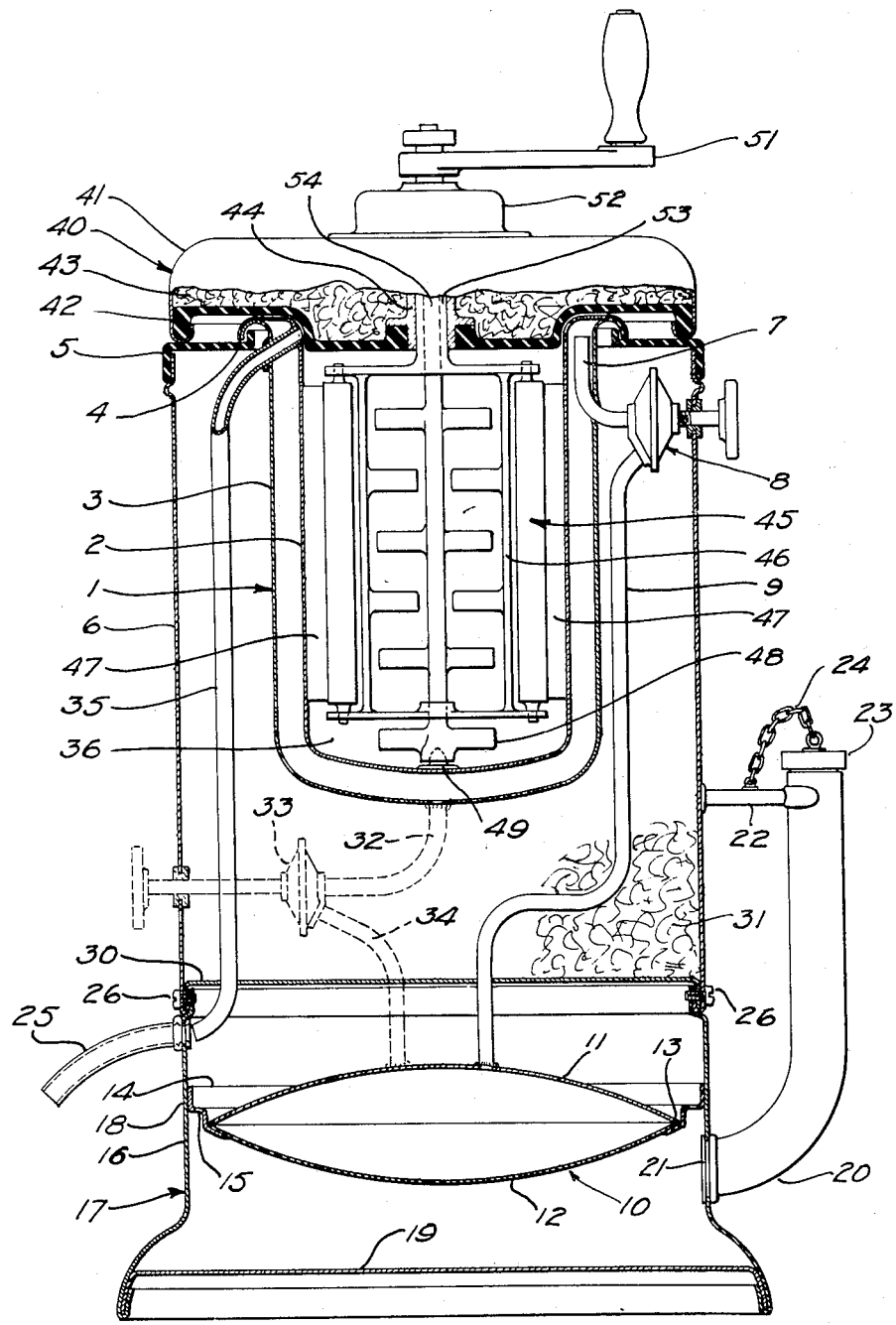
Figure 1 is a sectional elevation of one form of my invention, preferred for use with certain refrigerants.

Referring to Figure 1, 1 is a freezing shell which is formed of an inner shell 2 and an outer shell 3, welded together at the point 4. The freezing chamber 1 rests at the point 4 on a cover plate 5, which in turn is supported on an upper casing 6. Welded into the outer shell 3 of the freezing shell 1 is a tube 7, which is connected to a diaphragm valve 8. The diaphragm valve 8 is connected by a tube 9 to an absorber chamber 10, formed of an upper head 11 and a lower head 12, joined by a weld 13 at their edges. The absorber chamber 10 is supported by a ring 14, which is perforated by holes 15 and attached to a casing 16 of a base 17 by spot welds 18. A bottom plate 19 is crimped into the lower portion of the casing 16 of the base 17. A hollow handle 20 is joined to the casing 16 of the base 17 by a flanged connection 21, and to the upper casing 6 by a strut 22. A plug 23 closes the open upper end of the hollow handle 20 and is attached to the strut 22 by a chain 24, to avoid loss.

A bottom 30 is crimped into the upper shell 6; the space between the bottom 30, the upper shell 6, the outer shell 3, and the cover plate 5 is filled with thermo-insulating material 31, shown only in a portion of the drawings.

An overflow pipe 25 is flanged into the casing 16 at a level some distance above the top of the absorber chamber 10. The base 17 is attached to the upper casing 6 by screws 26. A tube 32 connects the low point of the outer shell 3 of the freezing chamber 1 with a diaphragm valve 33, which in turn is connected by a tube 34 to the upper head 11 of the absorber chamber 10. An overflow tube 35 is welded to the inner shell 2 and the outer shell 3 of the freezing shell 1 at the points where it passes through them, and connects the upper portion of the food compartment 36 formed by the inner shell 2 to a point in the base 17 near the inlet end of the overflow pipe 25. A cover 40 is formed of a head 41 and a plate 42, between which is packed thermo-insulating material 43. Into the plate 42 is pressed a bushing 44, in which is journalled a dasher assembly 45. The dasher assembly 45 consists of an outer dasher frame 46, which carries pivoted scraper blades 47, and an inner dasher 48, which is journalled on a pivot 49, attached to the bottom of the inner shell 2. A crank 51 is connected by suitable gears in a gear box 52 to a tubular shaft 53 of the outer dasher frame 46, and to a solid shaft 54 of the inner dasher 48 in such a manner as to rotate the dashers in opposite directions when the crank 51 is turned.

Assuming that the device is in condition to carry out a freezing cycle, the operation is as follows:

Material to be frozen is placed in the food chamber 36, and the cover 40 carrying the dasher assembly 45 is put in place. At this time the space in the freezing shell 1 between the inner shell 2 and the outer shell 3 will be practically full of refrigerant. Let us assume that we are working on the water-ammonia absorption cycle; then the refrigerant is a strong liquor of ammonia, and the absorbing liquid in the absorber chamber 10 is water, or a weak liquor of ammonia. The plug 23 in the hollow handle 20 is removed, and cool water allowed to run from any convenient source through the hollow handle 20 into the base 17, and overflow through the overflow pipe 25.

The valve 8 is now opened, permitting the refrigerant in the freezing shell 1 to evaporate and absorb heat from the material in the food compartment 36. The vaporized refrigerant passes through the tube 7, the valve 8, and the tube 9 to the absorber chamber 10, where it is absorbed by the water or weak liquor. The heat of absorption is carried away by the stream of cool water circulating through the base 17, and the liquor in the absorber chamber 10 is kept in an absorbent state.

The dasher assembly 45 may be rotated by means of the crank 51, either intermittently or continuously, to agitate the material to be frozen, accelerate the rate of freezing, and inhibit the formation of large ice crystals.

The process of evaporation from the freezing shell 1 and absorption in the absorber chamber 10 continues until the material to be frozen has reached the desired consistency, at which time the valve 8 is closed. If it is desired to keep the frozen material cold for a period of time before use, the valve 8 may be "cracked," so as to permit a slow rate of evaporation of refrigerant, or it may be opened wide for short periods at convenient intervals.

When it is desired to regenerate the device for another freezing cycle, the cover 40 and the dasher assembly 45 are removed, and a stream of cold water is allowed to run into the food compartment 36 and to overflow through the overflow tube 35 to the overflow pipe 25. The valve 8 is opened and very hot water is introduced through the hollow handle 20 into the base 17, overflowing through the overflow pipe 25. As an alternative, the base 17 may be filled with water to a point slightly below the level of the overflow pipe 25, and the entire unit placed over a gas burner or other source of heat. However supplied, the heat drives off ammonia vapor from the absorber chamber 10 through the tube 9, the valve 8, and the tube 7 to the freezing shell 1, where it is condensed by the cool water. After a sufficient period of time for the necessary ammonia vapor to have been condensed in the freezing shell 1, the valve 8 is closed, and the supply of hot water or heat to the base 17 and of cold water to the food compartment 36 is discontinued. The device is now ready to start another freezing cycle.

After several freezing and regenerating cycles, using the water-ammonia absorption system, it is probable that a considerable quantity of water or weak liquor will have collected in the freezing shell 1. By opening the valves 8 and 33 this water or liquor may be drained into the absorber chamber 10 through the tube 32, the valve 33, and the tube 34, after which the device may be regenerated as set forth above.

Referring now to Figures 2 and 3, there is here shown another form of my device particularly adapted to the adsorption cycle using sulphur dioxide and silica jell, or anhydrous ammonia and calcium chloride. A removable food compartment 70 rests upon a cover 71, which is in turn supported upon a casing 72. Surrounding the food compartment 70 is an evaporator section 73, composed of an inner corrugated shell 73$i$ and an exterior corrugated shell 73$e$, welded together at their upper edges 74 and supported upon the cover 71 by brackets 75. The evaporator section 73 is connected by a tube 76 to a valve 77, which in turn is connected by a tube 78 to a cross header 79 of an adsorber unit 80 supported in a base 81, by lugs 82 on a bottom 83. The adsorber unit 80 is formed of a plurality (in this case 4) of flat spiral coils 84, 85, 86, and 87, lying one above the other in horizontal planes and connected at their inner and outer ends respectively to common headers 88 and 89. The cross header 79 connects the headers 88 and 89 together. Inserted through a wall 90 of the base 81 with a waterproof fitting 91 is an immersion type header 92 in which is mounted a thermostat (not shown) preferably of the bi-metallic concavo-convex disc type. Leads 93 and 94 serve to connect the immersion heater 92 to any convenient source of electricity.

Aside from the differences noted, the device shown in Figure 2 is substantially the same as that shown in Figure 1. The operation cycle, however, is somewhat different.

Let us assume that the device is ready to start a freezing cycle. In this case, the evaporator section 73 will be full of liquefied refrigerant. The valve 77 will be closed, and the tubes of the adsorber unit 80 will be full of activated adsorbing medium. After the food compartment 70 has been filled with material to be frozen, and the cover 40 and the dasher assembly 45 from Figure 1 placed in position, a stream of cooling water is introduced through the hollow handle 20, as in the first example, and the valve 77 is opened. Evaporated refrigerant passes through the tube 76, the valve 77, and the tubes 78 and 79 to the adsorber unit 80, where it is adsorbed by the adsorbing medium. The heat of adsorption is carried away by the cooling water circulating through the base 81.

When it is desired to regenerate or reactivate, a stream of cooling water is introduced into the food compartment 70 from which it overflows through an overflow groove 100. Water is drained from the base 81 by removing a plug 95, and the immersion heater 92 is connected. The immersion heater 92, controlled by its thermostat, heats the adsorber unit 80 to a temperature such that adsorbed refrigerant is vaporized and driven off through the tube 78, the valve 77, and the tube 76 to the evaporator chamber 73, where it is condensed by the cooling water circulating through the food compartment 70. When a sufficient length of time has elapsed for reactivation to be sufficiently complete, the current supply to the immersion heater 92 is shut off, the valve 77 is closed, the plug 101 replaced, and the water supply to the food compartment 70 stopped.

Referring now to Figure 4, which shows a valve which may be used at either 8, 33 or 77 of Figs. 1 and 2, tubes 101 and 102 are brazed into a body 103; ports 104 and 105 connect them to a chamber 106 formed between a diaphragm 107 and the body 103. A cover 108, the diaphragm 107 and the body 103 are tightly held together by a channel ring 109, forming a fluid-tight seal between the diaphragm 107 and the body 103. In the center of the diaphragm 107 is mounted a valve 110, the point of which may be forced by a screw 111 into the end of the port 104 to form a fluid-tight closure, and prevent flow of fluid between the tubes 101 and 102.

Since the absorber unit 10 and the adsorber unit 80 are equivalent in function, the differences there between being a function of the type of refrigerant selected, the word "absorber" will be used in the following claims to indicate either the absorber or adsorber.

I claim as my invention:

1. A portable refrigerating unit comprising: an open top freezing shell; a removable cover adapted to close the opening in the top of said shell; walls forming an expansion chamber partially surrounding said freezing shell; walls forming an absorber chamber situated below said expansion chamber; walls forming a cooling chamber surrounding said absorber chamber; a conduit connecting said absorber chamber with the top of said expansion chamber; a valve in said conduit; a volatile refrigerant boiling at a temperature below the atmospheric boiling point of water, said refrigerant being carried in the space including said expansion chamber, said absorber chamber, and said conduit; an absorbing medium carried in said absorber chamber; means by which either hot or cold water can be circulated through said cooling chamber; and a single supporting structure in which all of the previously recited elements are supported.

2. A portable refrigerating unit comprising: an open top freezing shell; a removable cover adapted to close the opening in the top of said shell; wall forming an expansion chamber partially surrounding said freezing shell; walls forming an absorber chamber situated below said expansion chamber; walls forming a cooling chamber surrounding said absorber chamber; a conduit connecting said absorber chamber with the top of said expansion chamber; a valve in said conduit; a volatile refrigerant boiling at a temperature below the atmospheric boiling point of water, said refrigerant being carried in the space including said expansion chamber, said absorber chamber, and said conduit; an absorbing medium carried in said absorber chamber; a drain conduit leading from the bottom of said expansion chamber to said absorber chamber; a drain valve in said drain conduit; means by which either hot or cold water can be circulated through said cooling chamber; and a single supporting structure in which all of the previously recited elements are supported.

3. A portable ice cream freezer comprising: an open top freezing shell; a removable cover adapted to close the opening in the top of said shell; a dasher assembly carried by said cover and projecting into said freezing shell when said cover is in place thereon, said dasher assembly being adapted to be operated by a crank above said cover; walls forming an expansion chamber partially surrounding said freezing shell; walls forming an absorber chamber situated below said expansion chamber; walls forming a cooling chamber surrounding said absorber chamber; a conduit connecting said absorber chamber with the top of said expansion chamber; a valve in said conduit; a volatile refrigerant boiling at a temperature below the atmospheric boiling point of water, said refrigerant being carried in the space including said expansion chamber, said absorber chamber, and said conduit; an absorbing medium carried in said absorber chamber; means by which either hot or cold water can be circulated through said cooling chamber; and a single supporting structure in which all of the previously recited elements are supported.

4. A portable ice cream freezer comprising: an open top freezing shell; a removable cover adapted to close the opening in the top of said shell; a dasher assembly carried by said cover and projecting into said freezing shell when said cover is in place thereon, said dasher assembly being adapted to be operated by a crank above said cover; walls forming an expansion chamber partially surrounding said freezing shell; walls forming an absorber chamber situated below said expansion chamber; walls forming a cooling chamber surrounding said absorber chamber; a conduit connecting said absorber chamber with the top of said expansion chamber; a valve in said conduit; a volatile refrigerant boiling at a temperature below the atmospheric boiling point of water, said refrigerant being carried in the space including said expansion chamber, said absorber chamber, and said conduit; an absorbing medium carried in said absorber chamber; a drain conduit leading from the bottom of said expansion chamber to said absorber chamber; a drain valve in said drain conduit; means by which either hot or cold water can be circulated through said cooling chamber; and a single supporting structure in which all of the previously recited elements are supported.

5. A portable refrigerating unit comprising: an open top freezing shell; a removable cover adapted to close the opening in the top of said shell; walls forming an expansion chamber partially surrounding said freezing shell; walls forming an absorber chamber situated below said expansion chamber; walls forming a cooling chamber surrounding said absorber chamber; a conduit connecting said absorber chamber with the top of said expansion chamber; a valve in said conduit; a volatile refrigerant boiling at a temperature below the atmospheric boiling point of water, said refrigerant being carried in the space including said expansion chamber, said absorber chamber, and said conduit; an absorbing medium carried in said absorber chamber; means by which either hot or cold water can be circulated through said cooling chamber; an overflow pipe through which liquid may escape from the top of said freezing shell; means on said cover for restricting the flow of liquid through said overflow pipe when said cover is in place on said freezing shell; and a single supporting structure in which all of the previously recited elements are supported.

6. A portable refrigerating unit comprising: an open top freezing shell; a removable cover adapted to close the opening in the top of said shell; walls forming an expansion chamber partially surrounding said freezing shell; walls forming an absorber chamber situated below said expansion chamber; walls forming a cooling chamber surrounding said absorber chamber; a conduit connecting said absorber chamber with the top of said expansion chamber; a valve in said conduit; a volatile refrigerant boiling at a temperature below the atmospheric boiling point of water, said refrigerant being carried in the space including said expansion chamber, said absorber chamber, and said conduit; an absorbing medium carried in said absorber chamber; a drain conduit leading from the bottom of said expansion chamber to said absorber chamber; a drain valve in said drain conduit; means by which either hot or cold water can be circulated through said cooling chamber; an overflow pipe through which liquid may escape from the top of said freezing shell; means on said cover for restricting the flow of liquid through said overflow pipe when said cover is in place on said freezing shell; and a single supporting structure in which all of the previously recited elements are supported.

7. A portable ice cream freezer comprising: an open top freezing shell; a removable cover adapted to close the opening in the top of said shell; a dasher assembly carried by said cover and projecting into said freezing shell when said cover is in place thereon, said dasher assembly being adapted to be operated by a crank above said cover; walls forming an expansion chamber partially surrounding said freezing shell; walls forming an absorber chamber situated below said expansion chamber; walls forming a cooling chamber surrounding said absorber chamber; a conduit connecting said absorber chamber with the top of said expansion chamber; a valve in said conduit; a volatile refrigerant boiling at a temperature below the atmospheric boiling point of water, said refrigerant being carried in the space including said expansion chamber, said absorber chamber, and said conduit; an absorbing medium carried in said absorber chamber; means by which either hot or cold water can be circulated through said cooling chamber; an overflow pipe through which liquid may escape from the top of said freezing shell; means on said cover for restricting the flow of liquid through said overflow pipe when said cover is in place on said freezing shell; and a single supporting structure in which all of the previously recited elements are supported.

8. A portable ice cream freezer comprising: an open top freezing shell; a removable cover adapted to close the opening in the top of said shell; a dasher assembly carried by said cover and projecting into said freezing shell when said cover is in place thereon, said dasher assembly being adapted to be operated by a crank above said cover; walls forming an expansion chamber partially surrounding said freezing shell; walls forming an absorber chamber situated below said expansion chamber; walls forming a cooling chamber surrounding said absorber chamber; a conduit connecting said absorber chamber with the top of said expansion chamber; a valve in said conduit; a volatile refrigerant boiling at a temperature below the atmospheric boiling point of water, said refrigerant being carried in the space including said expansion chamber, said absorber chamber, and said conduit; an absorbing medium carried in said absorber chamber; a drain conduit leading from the bottom of said expansion chamber to said absorber chamber; a drain valve in said drain conduit; means by which either hot or cold water can be circulated through said cooling chamber; an overflow pipe through which liquid may escape from the top of said freezing shell; means on said cover for restricting the flow of liquid through said overflow pipe when said cover is in place on said freezing shell; and a single supporting structure in which all of the previously recited elements are supported.

BRUCE BURNS.